(12) United States Patent
Weckbecker

(10) Patent No.: US 6,523,708 B2
(45) Date of Patent: Feb. 25, 2003

(54) MOBILE CRANE WITH A RELEASABLE COUPLING CONNECTING THE SUBSTRUCTURE TO THE SUPERSTRUCTURE

(75) Inventor: Alfons Weckbecker, Zweibrücken (DE)

(73) Assignee: Demag Mobile Cranes GmbH & Co. KG, Munich (DE)

( * ) Notice: Subject to any disclaimer, the term of this patent is extended or adjusted under 35 U.S.C. 154(b) by 0 days.

(21) Appl. No.: 09/923,503

(22) Filed: Aug. 7, 2001

(65) Prior Publication Data
US 2002/0020685 A1 Feb. 21, 2002

(30) Foreign Application Priority Data
Aug. 9, 2000 (DE) ......................... 100 39 573

(51) Int. Cl.[7] .............................. B66C 23/84
(52) U.S. Cl. .................. 212/181; 212/253; 384/593
(58) Field of Search .................. 212/180, 181, 212/253; 384/591, 592, 593; 37/397

(56) References Cited

U.S. PATENT DOCUMENTS

| | | | |
|---|---|---|---|
| 3,726,418 A | * 4/1973 | Short ........................ 212/69 |
| 3,921,817 A | 11/1975 | Petrik et al. | |
| 3,923,407 A | * 12/1975 | Jensen et al. ............... 403/165 |
| 3,941,252 A | * 3/1976 | Six et al. ...................... 212/69 |
| 4,161,344 A | * 7/1979 | Delarbre et al. ............ 308/222 |
| 4,248,488 A | * 2/1981 | Sable ......................... 308/220 |
| 4,452,433 A | * 6/1984 | Muhlbauer et al. ......... 266/142 |
| 4,466,551 A | * 8/1984 | Leung ........................ 220/293 |
| 4,478,340 A | * 10/1984 | Delago ....................... 212/253 |
| 4,573,811 A | * 3/1986 | Andree et al. .............. 384/622 |
| 5,121,561 A | * 6/1992 | Palfreyman .................. 37/397 |
| 5,289,928 A | * 3/1994 | Maier ......................... 212/253 |
| 5,664,692 A | * 9/1997 | Sauter et al. ............... 212/181 |

* cited by examiner

*Primary Examiner*—Thomas J. Brahan
(74) *Attorney, Agent, or Firm*—Cohen, Pontani, Lieberman & Pavane

(57) ABSTRACT

A rotatably mounted ring having external teeth which mesh with a drive pinion of a fixedly mounted slewing gear, has distributed over the circumference, alternately portions of the same length with recesses and portions of the same length with radially directed webs and can be coupled to a complementary ring in the manner of a bayonet fastening. The complementary ring has, both on the inside and on the outside, portions of the same length with recesses and portions of the same length with radially directed webs. The ring provided with the external toothing is provided with complementary recesses and webs.

11 Claims, 4 Drawing Sheets

MOBILE CRANE WITH A RELEASABLE COUPLING CONNECTING THE SUBSTRUCTURE TO THE SUPERSTRUCTURE

BACKGROUND OF THE INVENTION

1. Field of the Invention

The invention relates to a mobile crane with a releasable coupling connecting the substructure to the superstructure, the coupling including a rotatably mounted ring with external teeth for meshing with a drive pinion of a slewing gear to rotate the ring.

2. Description of the Related Art

In the case of mobile or vehicle-mounted cranes with a high lifting capacity, both the substructure and the superstructure with jib become so heavy that it is necessary for the superstructure with jib to be transported on a special transport vehicle, in particular a low loader. For this purpose, the superstructure mounted rotatably on the substructure must be releasable from the latter. One of the requirements in this case is that the coupling be designed so that the superstructure can be released from the substructure simply and quickly and can be attached again to the latter and coupled to it simply and quickly.

Such a coupling is known from U.S. Pat. No. 3,921,817. It includes a ring having external teeth and fixed to the substructure. Mounted rotatably on the inside of this fixed ring is a further ring which is provided, distributed over the circumference, with inwardly extending webs. Arranged on the superstructure are two segments mounted in an articulated manner, which are provided on the outside, distributed over the circumference, with outwardly extending webs, the gaps between these being somewhat larger than the width of the webs of the inner ring. After the superstructure has been put in place, the two segments are pressed onto the inner ring as a result of the actuation of two piston/cylinder units and are coupled to one another by relative rotation in the manner of a bayonet fastening. The driving pinion of the slewing gear is mounted on the superstructure and comes into engagement with the external toothing of the fixed ring when the superstructure is put in place. The connection between the two segments and the rotatable inner ring is made via a plurality of adjustable link blocks arranged over the circumference on the rotatable inner ring.

An improved coupling is disclosed in DE 29 508 567 U1. This coupling consists of a holding ring connected to the substructure and of an axial cylindrical annular extension of an externally toothed ring mounted rotatably on the superstructure. The holding ring is provided with radially inwardly directed and the annular extension with radially outwardly directed claw-like webs which are arranged so as to be distributed uniformly over the circumference. They at least partially cover a common annular space concentric to the axis of rotation and are at a distance from one another such that the webs of one part can be pushed in the axial direction through the web gaps of the other part into radial planes offset to one another. By the toothed ring being rotated, the webs of one part engage behind the webs of the other part in the manner of a bayonet fastening.

One disadvantage of the known constructions is that the forces capable of being transmitted by means of this coupling are limited.

SUMMARY OF THE INVENTION

The object of the invention is to provide a releasable coupling for a mobile crane, one coupling connecting the substructure to the superstructure and being capable of transmitting higher forces, in particular for large grid cranes.

According to the teaching of the invention, the complementary ring has, both on the inside and on the outside, radially directed recesses and webs of the same length. The ring provided with the external teeth is provided with complementary recesses and webs. Selectively, web and recess and also web and web or recess and recess may be located opposite one another. For production reasons, the last-mentioned variant is to be preferred. The proposed arrangement has the advantage that high forces can consequently be transmitted and no unilateral moments occur on the middle ring.

According to a further feature of the invention, the ring provided with the external teeth is designed as a multiple-row roller-type rotary connection. Preferably, the roller-type rotary connection consists of a one-part or two-part fixed ring and of two or three annular rotatable elements which are connected to one other via screws. For high force transmission, a five-row or six-row roller-type rotary connection has proved beneficial, preferably the fifth roller set being arranged on the outside and the sixth roller set on the inside of the fixed ring.

Preferably, the complementary one-part or two-part ring is fastened to the superstructure, the webs being directed toward the substructure. In terms of weight distribution, it has proved beneficial to fasten and mount the driving pinion, together with the slewing gear, on the substructure. Where very large diameters are concerned, the arrangement of two slewing gears located opposite one another is advantageous.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
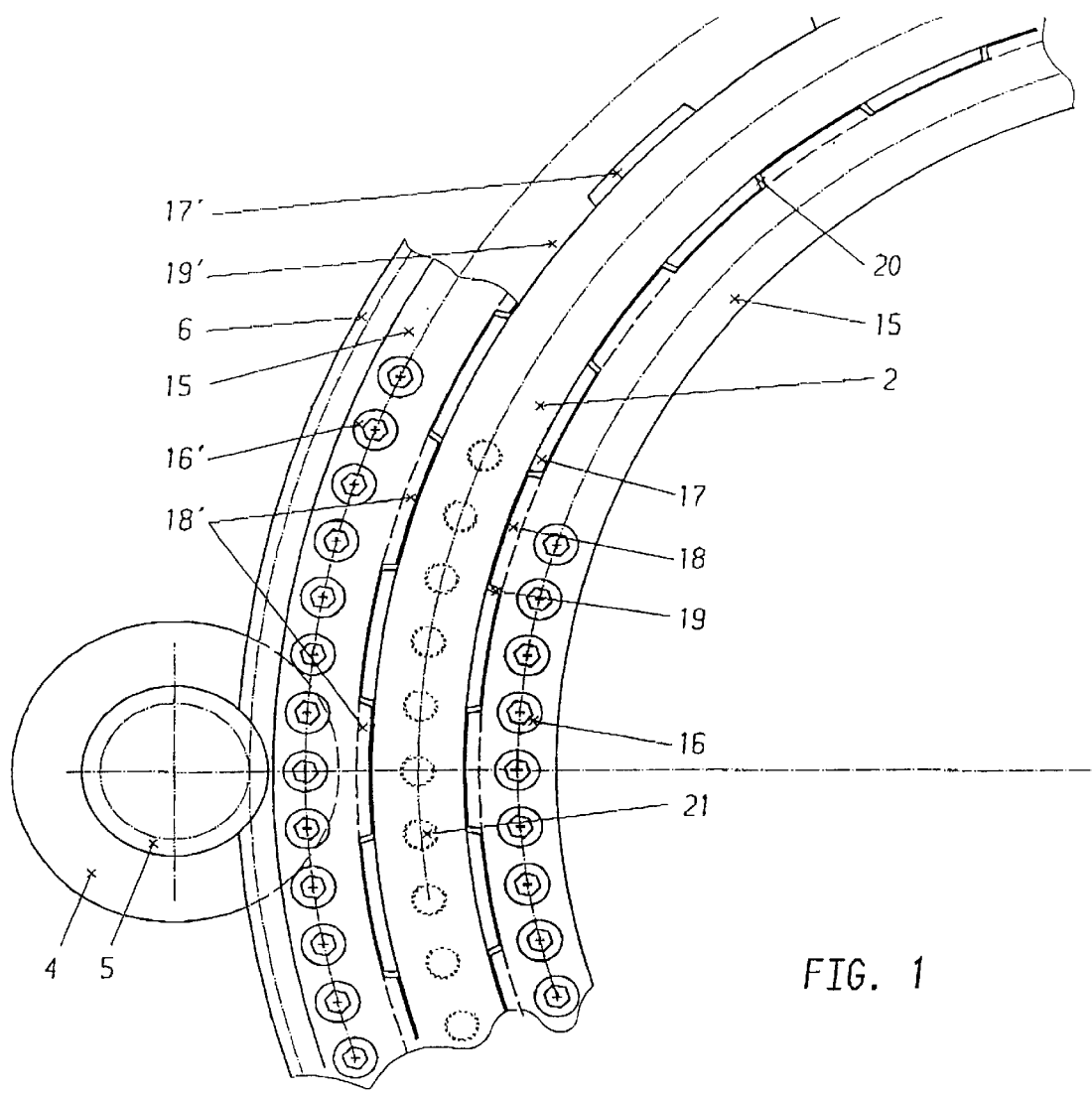
FIG. 1 is a partial plan view of the coupling according to the invention, in the uncoupled state.
Figure 2:
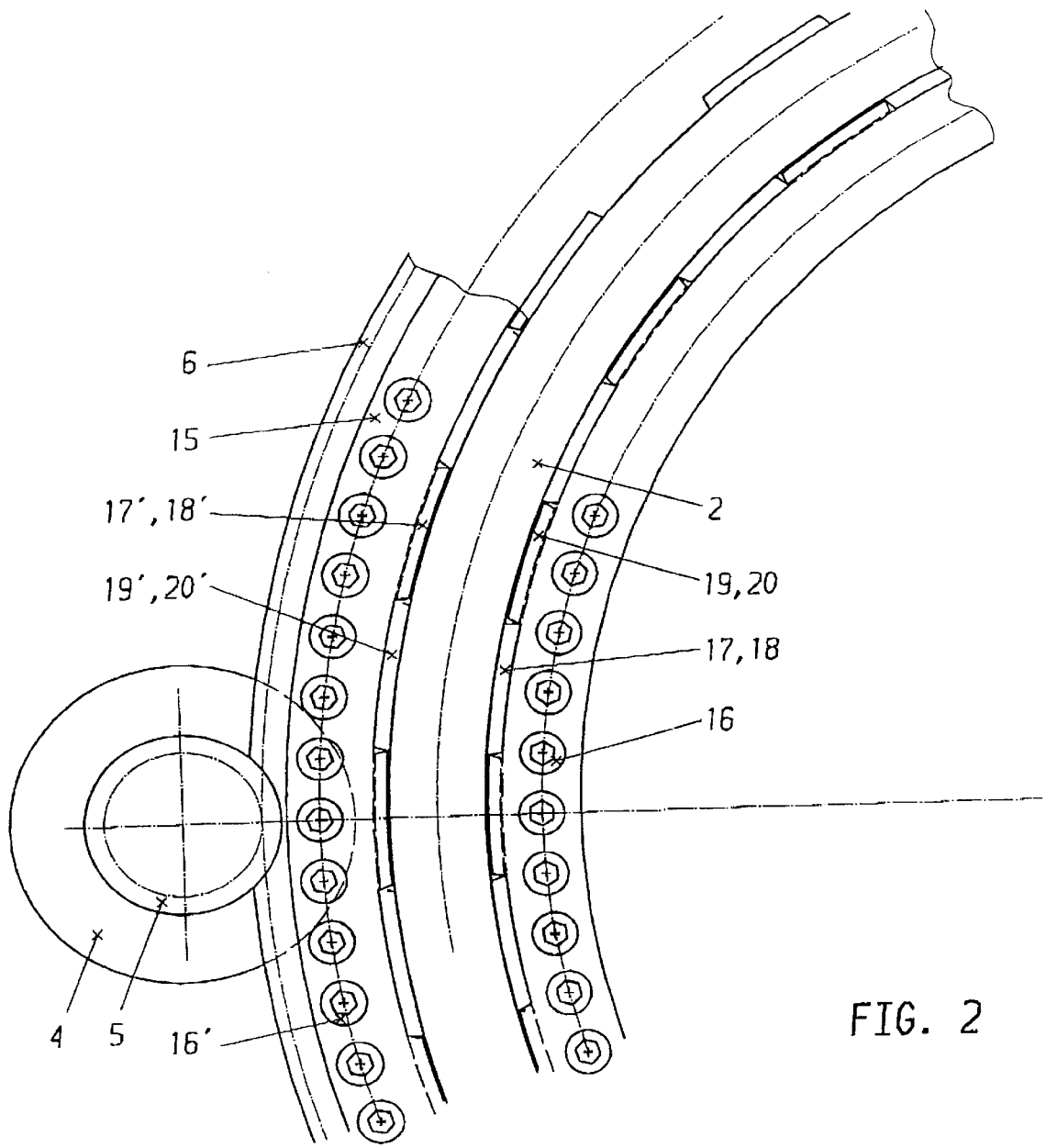
FIG. 2 shows the same as in FIG. 1, but in the coupled state.
Figure 3:
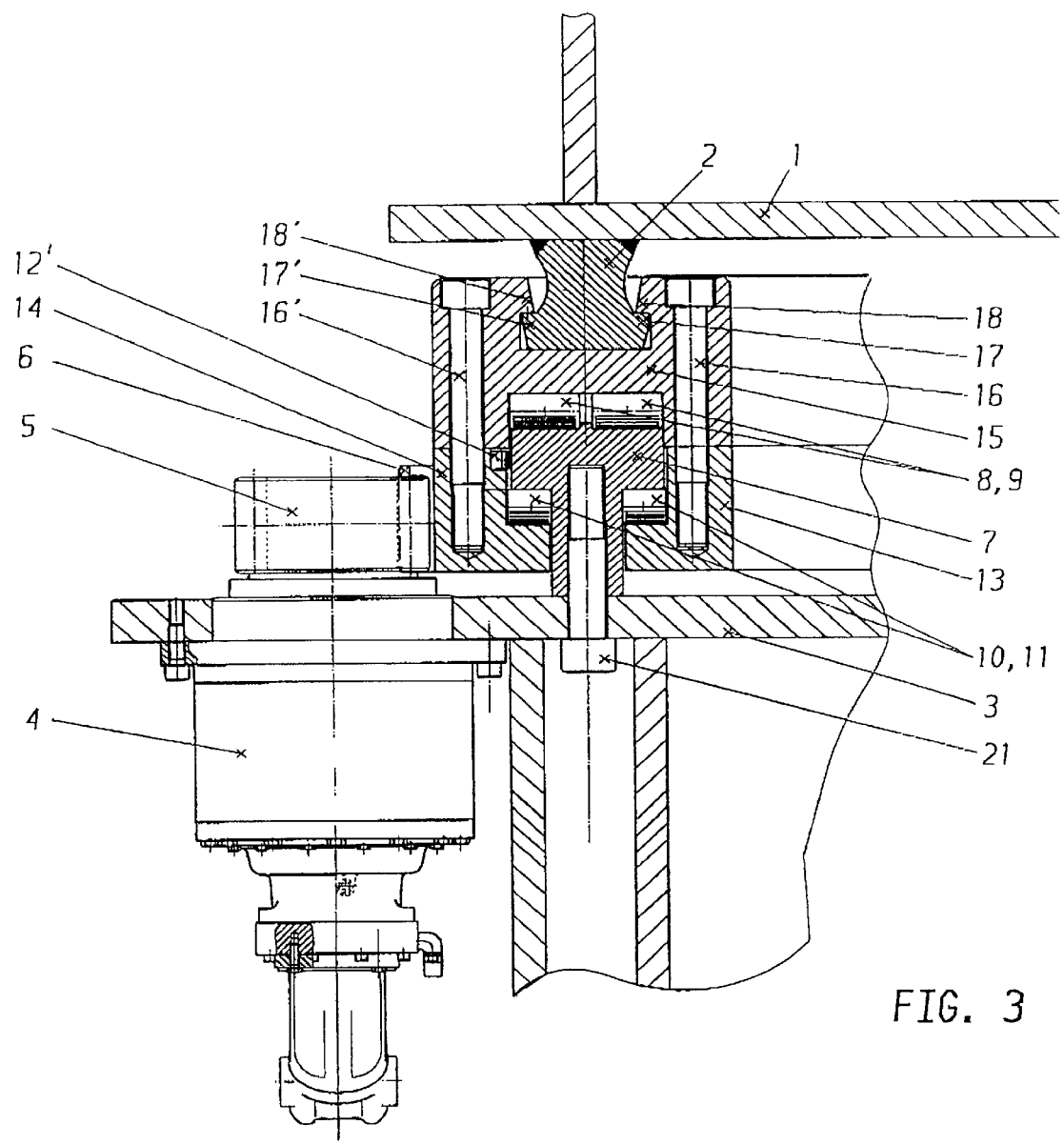
FIG. 3 shows a section in direction A—A in FIG. 2.

FIGS. 1 and 2 illustrate a top view and FIG. 3 a section of a part segment of the coupling designed according to the invention. A ring 2 having two webs 17, 17' is fastened to the underside of a baseplate 1 of the superstructure. Fastened to the underside of a bottom plate 3 of the substructure is a slewing gear 4, on the output shaft of which is arranged a pinion 5. This pinion 5 meshes with the external toothing 6 of a ring designed as a roller-type rotary connection. Depending on the size of the diameter, it may be necessary to arrange two slewing gears, these being located opposite one another. The roller-type rotary connection, which is five-row in this embodiment, includes a fixed ring 7 fastened on the bottom plate 3 by means of screws 21. The ring 7 receives a total of five roller sets 8–11, 12'. Two roller sets 8, 9 are mounted on the top side and two roller sets 10, 11 on the underside and the fifth roller set 12' is mounted on the outside of the fixed ring 7. The roller sets 8–11, 12' are held by a total of three annular rotatable elements 13–15 which surround the fixed ring 7. Two elements 13, 14 are designed mirror-symmetrically to one another. The annular elements 13–15 are held by two rows of screws 16, 16' extending through them.

When the superstructure is placed on the substructure, webs 17, 17' on the upper ring 2 are received in recesses 19, 19' between teeth 18, 18' on the upper annular element 15. Likewise, webs 18, 18' on the upper annular element 15 are received in recesses 20, 20' between webs 17, 17' on the upper ring 2.

Coupling after the superstructure has been put in place on the substructure may be carried out by means of the slewing gear 4 or by means of hydraulic piston/cylinder units not illustrated here. This causes the webs 17, 17' on the upper ring 2 to move under the webs 18, 18' on upper annular element 15, as shown in FIGS. 2 and 3. It goes without saying that, after coupling, the upper annular element 15 of the roller-type rotary connection must be locked relative to the complementary ring 2 or alternatively relative to the superstructure, so that the superstructure is rotated when the slewing gear 4 is actuated. Means for locking are disclosed in U.S. Pat. No. 3,921,817.

Figure 4:
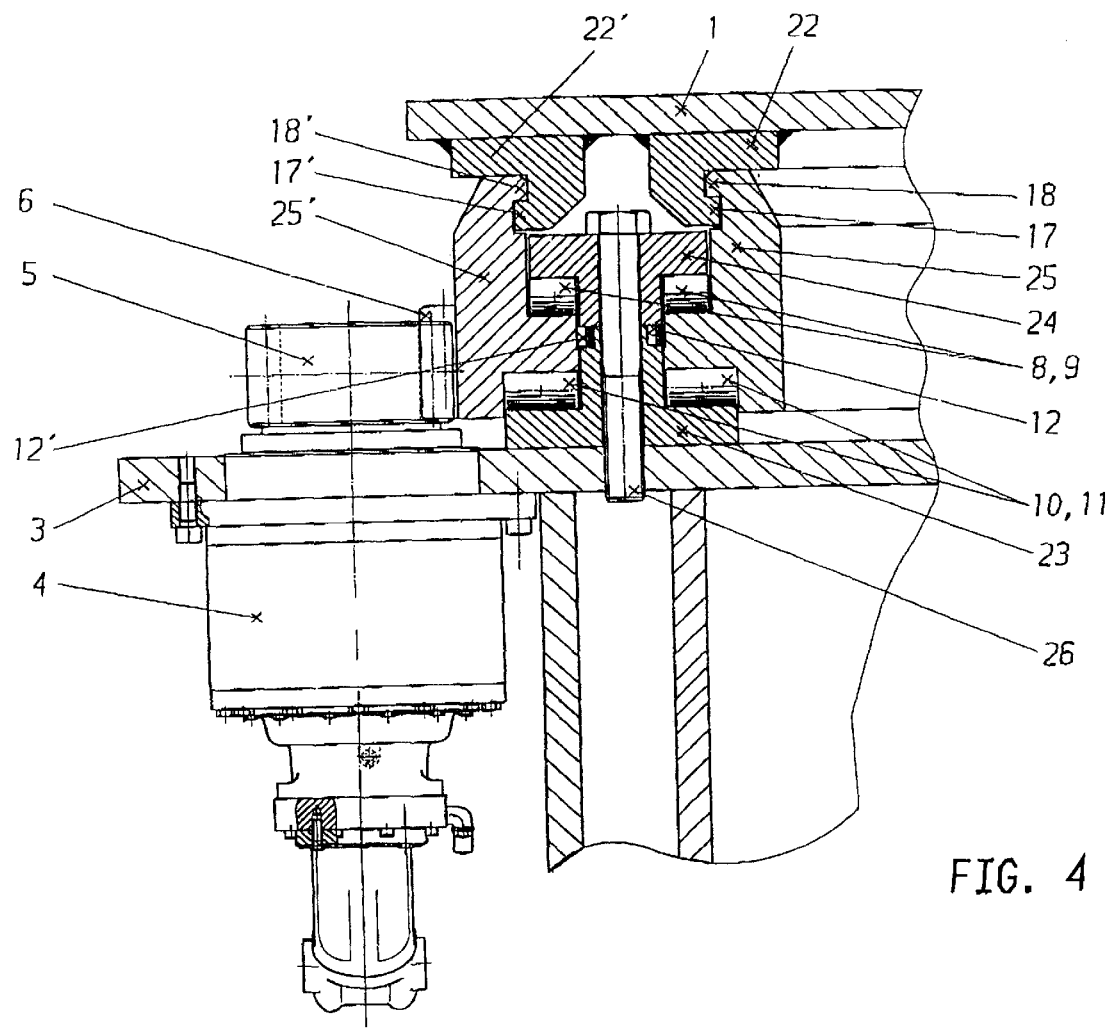
FIG. 4 shows the same as FIG. 3, but in a further embodiment.

FIG. 4 illustrates a second embodiment in the same section as in FIG. 3, the same reference symbols being used for identical parts.

In contrast to FIG. 3, the complementary ring consists of two rings 22, 22' which are arranged at a radial distance from one another and are fastened to the underside of the baseplate 1 of the superstructure. Each ring 22, 22' is provided, in the portion with webs, with either a radially inwardly extending or with a radially outwardly extending web 17, 17'.

The ring, designed as a roller-type rotary connection and provided with an external toothing 6, has two fixed rings 23, 24, arranged one above the other, and two annular rotatable elements 25, 25' designed mirror-symmetrically to one another. In this exemplary embodiment, the rotary mounting is six-row with six roller sets 8, 9, 10, 11, 12, 12'. The roller-type rotary connection is held together by means of screws 26 in a row of screws. For this exemplary embodiment, too, it is necessary that, after the superstructure is put in place and coupling has been carried out, the annular rotatable elements 25, 25' must be locked relative to the rings 22, 22' of the complementary ring or of the superstructure.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A mobile crane of the type comprising a substructure, a superstructure, and a releasable coupling connecting the substructure to the superstructure, said releasable coupling comprising a rotatably mounted ring having external teeth for meshing with a drive pinion of a slewing gear to rotate said ring with respect to said substructure, said ring having outer radially extending webs alternating with outer radially extending recesses, said outer webs and recesses having like circumferential length, and inner radially extending webs alternating with inner radially extending recesses, said inner webs and recesses having like circumferential length, and a complementary ring having outer radially extending webs alternating with outer radially extending recesses, said outer webs and recesses of said complementary ring being complementary to said outer webs and recesses of said rotatably mounted ring, and inner radially extending webs alternating with inner radially extending recesses, said inner webs and recesses of said complementary ring being complementary to said inner webs and recesses of said rotatably mounted ring, whereby, said complementary ring can be mated to said rotatably mounted ring in the manner of a bayonet fastening.

2. A mobile crane as in claim 1 wherein said inner webs and said outer webs on said rotatably mounted ring are located opposite one another, and said inner webs and said outer webs on said complementary ring are located opposite one another.

3. A mobile crane as in claim 1 wherein said rotatably mounted ring comprises a fixed ring fixed to said substructure, at least one annular element which is rotatable with respect to said fixed ring, and a plurality of rows of rollers between said fixed ring and said at least one annular element.

4. A mobile crane as in claim 3 comprises three of said annular elements, two rows of bolts holding said annular elements to each other, and at least four of said rows of rollers.

5. A mobile crane as in claim 4 comprising five of said rows of rollers, one of said rows being arranged on the outer surface of said fixed ring.

6. A mobile crane as in claim 4 comprising six rows of said rollers, one of said rows being arranged on the outside surface of said fixed ring, another one of said rows being arranged on the inside surface of said fixed ring.

7. A mobile crane as in claim 1 wherein said complementary ring comprises two rings which are spaced apart radially.

8. A mobile crane as in claim 7 wherein said rotatably mounted ring comprises a two-part fixed ring, a row of bolts holding said fixed ring to said substructure, two-annular elements which are rotatable with respect to said fixed ring, and at least four rows of rollers between said fixed ring and said annular elements.

9. A mobile crane as in claim 1 wherein said complementary ring is fixed to said superstructure.

10. A mobile crane as in claim 1 further comprising a slewing gear fixed to said substructure, said slewing gear having fixed thereto a drive pinion which meshes with said external teeth of said rotatably mounted ring.

11. A mobile crane as in claim 1 comprising two of said slewing gears fixed to said substructure on opposite sides of said rotatably mounted ring.

* * * * *